UNITED STATES PATENT OFFICE.

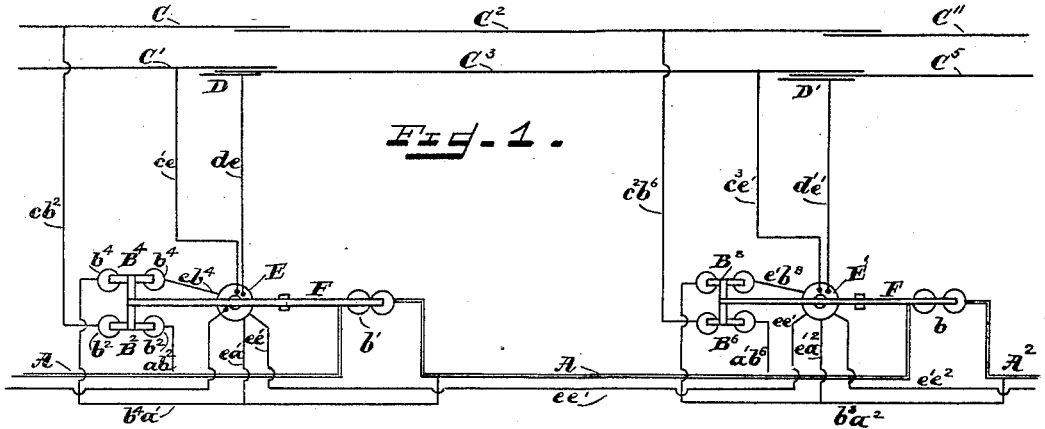

NELSON W. PERRY, OF CINCINNATI, OHIO.

SYSTEM OF ELECTRIC DISTRIBUTION.

SPECIFICATION forming part of Letters Patent No. 467,897, dated January 26, 1892.

Application filed April 13, 1891. Serial No. 388,683. (No model.)

*To all whom it may concern:*

Be it known that I, NELSON W. PERRY, a citizen of the United States, residing at Cincinnati, in the county of Hamilton and State of Ohio, have invented a certain new and useful Improvement in Series Systems of Electric Distribution, of which the following is a specification.

In the series system of electric distribution the high potential necessarily employed in bare wires has been a serious drawback both on account of the liability to leakage or loss of power and the danger to life. This drawback is so serious as to practically preclude the employment of the series system in conduits or underground systems, where the difficulties of insulation are greatly increased.

In my application for Letters Patent of the United States for improvements in systems of electric distribution filed April 2, 1891, Serial No. 387,330, I have described a system of electric distribution which involves the employment of a main current-conveyer made in sections, each section being normally connected electrically with the adjacent sections; two lines of working conductors arranged in pairs, each lapping but normally insulated from the adjacent conductors in the same line; switches normally connecting the sections of the main current-conveyer; provisions for opening the switches and diverting the current from the main conveyer in such manner that it will pass through the translating device and return to the normal circuit, and supplemental conductors by means of which the continuity of the current may be maintained. In such a system, while there is no current upon the working conductors, except upon the sections occupied by a translating device, if each working conductor is permanently connected with the main circuit it will have the same potential as the latter, and if there should be a "ground" on the circuit and a grounded wire should fall across either of the bare working conductors it would draw off a portion of the current and possibly cause injury to life or property.

It is the object of my invention to obviate this difficulty; and the invention consists in means for automatically disconnecting the conductors from the main circuit when they become idle and for automatically restoring the connection when the conductors are called into use.

I have illustrated my invention as applied to a series railway, such as is described in the application above referred to.

In the drawings, Figure 1 is a plan view showing an electric railway with two switches and their connections embodying my invention. Fig. 2 is a perspective view of one of the switches and its connections.

$A\ A'\ A^2$ represent sections of the main current-conveyer or normal circuit. Each of these sections has at its ends mercury-cups $b$, separated by a space from the cups at the ends of the adjacent sections. Into the pairs of adjacent cups normally take U-shaped double pole-contacts B and B', which bridge the gaps between the sections and render them electrically continuous.

$C\ C^2\ C^4$ represent one line of working conductors, and $C'\ C^3\ C^5$ another line. Each of these conductors laps, but is normally insulated from, the adjacent conductors of the same line.

$D\ D'$ are supplemental conductors arranged parallel with but insulated from the working conductors $C'\ C^3$, &c.

E is a solenoid-magnet wound in the same direction with three independent coils of wire. The armature of magnet E is connected with and controls a lever F, which carries at one end the fork or circuit-breaker B, and at the other end a pair of like forks or circuit-breakers $B^2$ and $B^4$, insulated from each other and adapted to take, respectively, into pairs of mercury-cups $b^2$ and $b^4$. The fulcrum of lever F is between fork B and the armature connection, and the lever is so mounted that fork B will normally dip into the mercury-cups, while forks $B^2$ and $B^4$ are normally out of contact with the mercury. Vitalization of the magnet will attract the armature and actuate lever F, thereby withdrawing fork B from the mercury-cups, breaking the main circuit at that point, and at the same time lowering forks $B^2$ and $B^4$ into their mercury-cups. Electrical connection is made between section A of the main conveyer and working conductor C through circuit-breaker $B^2$ by wires $a\ b^2$ and $c\ b^2$. Working conductor $C'$ is connected with coil 1 of magnet E by a wire $c'\ e$ and coil 1 with section $A'$ of the main conveyer by wire $e\ b^4$, circuit-breaker $B^4$, and wire $b^4\ a'$. Supplemental conductor D is connected with coil 2 of magnet E by a wire $d\ e$, coil 2 with a wire $e\ e'$, which in turn connects with coil 3 of magnet E', which is connected with a section of the main conveyer beyond switch B, the connection shown being by a wire $e'\ a^2$ leading to wire $b^8\ a^2$. Assuming a motor to be traveling from left to right with its trolleys in contact with the working conductors C and C' only, the switch B should be open and $B^2$ and $B^4$ closed, and the path of the current will be from section A of the main conveyer through wire $a\ b^2$, switch $B^2$, wire $c\ b^2$, working conductor C, the motor, working conductor C', wire $c'\ e$, coil 1 of magnet E, wire $e\ b^4$, and wire $b^4\ a'$ to section A' of the main conveyer. When one of the trolleys contacts with supplemental wire D, the current, after passing through the motor, will divide, part following the old path and part going *via* supplemental wire D, wire $d\ e$, coil 2 of magnet E, wire $e\ e'$, coil 3 of magnet E', and wires $e'\ a^2$, and $b^8\ a^2$ to section $A^2$ of the main conveyer. This current actuates magnet E', opening switch B' and closing $B^6$ and $B^8$, thus connecting working conductors $C^2$ and $C^3$ with the main circuit and preparing them to perform their part in operating the motor. When the trolley passes from the supplemental conductor, the current through the supplemental conductor will be cut off; but the trolleys being in contact with working conductors C and $C^3$ and switch $B^8$ being closed, a current will have been established *via* working conductor $C^3$, wire $c^3\ e'$, coil 1 of magnet E', wire $e'\ b^8$, switch $B^8$, and wire $b^8\ a^2$ to section $A^2$ of the main circuit. When the trolley passes from working conductor C', the current through magnet E is cut off and switch B closes. Until B is closed, the current through working conductors C and $C^3$ is maintained; but when B closes, $B^6$ being also closed, the current finds its way *via* $a'\ b^6$, switch $B^6$, and wire $c^2\ b^6$ to working conductor $C^2$. In this way the motor itself just before entering a section connects that section with the main circuit and breaks the connection just as it leaves the section. All of the wires, except those with which the trolleys contact, may be covered each with its own insulation, and the trolley-wires being totally disconnected with the main circuit, except when a motor is on the section, cannot contribute to the general leakage. The system is therefore adapted to either conduit or overhead construction.

I claim—

1. The combination, in a system of electric distribution for movable translating devices, of a sectional current-conveyer, switches normally closing the gaps between the sections, two lines of working conductors arranged in pairs, each conductor lapping the succeeding conductor of the same line, but normally insulated therefrom, a connection between one member of each pair of working conductors and one section of the main conveyer, a connection between the other member of the pair through the switch-controlling magnet and another section of the main conveyer, switches adapted to break these connections, magnets controlling the switches, supplemental conductors adjacent to but normally insulated from the lapping portions of one line of conductors, and a connection from the supplemental conductors through the magnet controlling one of the switches in the main circuit to the magnet controlling the switch in an adjacent section, and thence around the switch to the main circuit, substantially as and for the purpose specified.

2. The combination, in a system of electric distribution for movable translating devices, of a sectional current-conveyer, switches normally closing the gaps between the sections, magnets wound with three independent coils of wire adapted to actuate the switches, two lines of working conductors arranged in pairs, each conductor lapping the succeeding conductor of the same line, but normally insulated therefrom, a connection between one member of each pair and one section of the main conveyer, a switch adapted to break this connection, a connection between the other member of the pair and another section of the main conveyer through one coil of a switch-controlling magnet, a switch adapted to break this connection, a connection between the switch in the main conveyer and the switches in the working-conductor connections, whereby the switches in each section may be actuated concurrently, those in the working-conductor connections closing as that in the main circuit opens and opening as the latter closes, supplemental conductors adjacent to but normally insulated from the lapping portions of one line of conductors, and a connection from the supplemental conductor through a second coil of the switch-controlling magnet to a coil in the magnet controlling the switch of the succeeding section of the main circuit in the direction in which the current travels, and thence around that switch to the main circuit, substantially as and for the purpose specified.

3. The combination, in a system of electric distribution for movable translating devices, of a sectional current-conveyer, switches normally closing the gaps between the sections, two lines of working conductors arranged in pairs and normally insulated from the main current-conveyer, each conductor lapping the succeeding conductor of the same line, but normally insulated therefrom, switches adapted to make electrical connection between the main conveyer and the working conductors, magnets controlling the switches, supplemental conductors adjacent to but normally insulated from the lapping portion of one line of conductors, and a connection from the supplemental conductors through the magnet controlling one of the switches in the main circuit to the magnet controlling the switch in the succeeding section in the direction in which the current travels, and thence around the switch to the main circuit, substantially as and for the purpose specified.

4. The combination, in a system of electric distribution for movable translating devices, of the sectional current-conveyer A A', the working conductors C C$^2$ and C' C$^3$, the supplemental conductors D D', the magnets E and E', the bar F, carrying circuit-breakers B, B$^2$, and B$^4$, and the connections $a\,b^2$, $c\,b^2$, $c'\,e$, $e\,b^4$, $b^4\,a'$, $d\,e$, $e\,e'$, and $e'\,a^2$, substantially as and for the purpose specified.

NELSON W. PERRY.

Witnesses:
  JAMES N. RAMSEY,
  AUGUST. F. HERBSLEB.